United States Patent
Eagan

(10) Patent No.: US 12,418,430 B1
(45) Date of Patent: Sep. 16, 2025

(54) DYNAMIC CONFIGURATION OF INTERFACE ELEMENTS FOR EYE CONTACT IN A COMMUNICATION SESSION

(71) Applicant: Zoom Video Communications, Inc., San Jose, CA (US)

(72) Inventor: Jeffrey Allen Eagan, Longmont, CO (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/143,383

(22) Filed: May 4, 2023

Related U.S. Application Data

(63) Continuation of application No. 17/878,005, filed on Jul. 31, 2022, now abandoned.

(51) Int. Cl.
*H04L 12/18* (2006.01)
*G06F 3/14* (2006.01)
*H04L 65/403* (2022.01)
*H04N 7/15* (2006.01)

(52) U.S. Cl.
CPC ........ *H04L 12/1813* (2013.01); *G06F 3/1446* (2013.01); *H04L 65/403* (2013.01); *H04N 7/15* (2013.01)

(58) Field of Classification Search
CPC .. H04N 21/4788; H04N 7/15; H04N 21/2187; H04L 65/403; H04L 51/04; H04L 12/1813; G06F 3/0486; G06F 3/04845; G06F 3/1446
See application file for complete search history.

(56) References Cited

U.S. PATENT DOCUMENTS

| | | | | |
|---|---|---|---|---|
| 6,507,356 B1* | 1/2003 | Jackel | .................... | H04N 7/142 348/14.06 |
| 8,754,923 B2* | 6/2014 | Chong | ................... | G03B 17/56 348/14.01 |
| 8,754,927 B2* | 6/2014 | Fritsch | ................... | H04N 7/144 348/14.08 |
| 8,823,769 B2* | 9/2014 | Sekine | ..................... | H04N 7/15 348/14.16 |
| 9,485,414 B2* | 11/2016 | Visosky | ............... | H04N 23/611 |
| 9,667,799 B2* | 5/2017 | Olivier | ................ | G06F 9/45558 |

(Continued)

*Primary Examiner* — Justin R. Blaufeld
(74) *Attorney, Agent, or Firm* — Kilpatrick Townsend & Stockton LLP

(57) ABSTRACT

Methods and systems provide dynamic configuration of interface elements for eye contact in a communication session. In one embodiment, a method presents, at one or more displays of a client device connected to a communication session, a user interface ("UI") for the communication session, the UI including one or more video feeds associated with participants of the communication session. The system receives a request from a participant to adjust one or more camera location settings, then presents the participant with one or more UI elements for designating camera location. The system receives a designation from the participant of one or more camera locations relative to the one or more displays of the client device. The system determines one or more highlighted video feeds, and then assigns a new location within the UI for each of the one or more highlighted video feeds corresponding to the designated camera.

20 Claims, 6 Drawing Sheets

(56) References Cited

U.S. PATENT DOCUMENTS

| | | | | |
|---|---|---|---|---|
| 9,743,040 | B1* | 8/2017 | Newstadt | H04N 7/15 |
| 9,942,519 | B1* | 4/2018 | Pan | H04N 21/47 |
| 10,097,598 | B2* | 10/2018 | Kay | H04L 65/403 |
| 10,182,210 | B1* | 1/2019 | Goetzinger, Jr. | H04N 7/147 |
| 10,282,088 | B2* | 5/2019 | Kim | G06F 3/0481 |
| 10,462,216 | B1* | 10/2019 | Vysotsky | H04L 67/104 |
| 10,616,528 | B2* | 4/2020 | Gurr | H04N 23/54 |
| 11,006,076 | B1* | 5/2021 | Raynor | H04N 7/147 |
| 11,153,235 | B1* | 10/2021 | Dalonzo | H04L 51/42 |
| 11,190,710 | B1* | 11/2021 | Han | H04N 5/272 |
| 11,196,963 | B1* | 12/2021 | DiPasquale | H04L 65/403 |
| 11,443,560 | B1* | 9/2022 | Wright | G06V 40/166 |
| 11,729,355 | B2* | 8/2023 | Morris | H04N 21/4122 348/14.07 |
| 11,783,645 | B2* | 10/2023 | Olshansky | G06Q 10/1053 348/148 |
| 2004/0239684 | A1* | 12/2004 | McGuire | G06F 3/0481 345/619 |
| 2006/0092269 | A1* | 5/2006 | Baird | H04N 21/4622 348/E7.083 |
| 2008/0158340 | A1* | 7/2008 | Shibata | H04N 7/144 348/14.16 |
| 2009/0164880 | A1* | 6/2009 | Lection | G06F 3/0481 715/212 |
| 2010/0073454 | A1* | 3/2010 | Lovhaugen | G06F 3/0486 348/E7.083 |
| 2010/0225737 | A1* | 9/2010 | King | H04N 7/152 348/14.09 |
| 2011/0193935 | A1* | 8/2011 | Gorzynski | H04N 7/142 348/E7.083 |
| 2012/0033030 | A1* | 2/2012 | Liu | H04N 7/15 348/E7.083 |
| 2013/0198629 | A1* | 8/2013 | Tandon | H04L 65/765 715/716 |
| 2014/0078240 | A1* | 3/2014 | Yang | H04N 7/15 348/14.03 |
| 2014/0337880 | A1* | 11/2014 | Sorbel | H04N 21/812 725/34 |
| 2015/0074533 | A1* | 3/2015 | Cafaro | G06F 3/0482 715/719 |
| 2015/0116362 | A1* | 4/2015 | Aurongzeb | G06F 3/1446 345/650 |
| 2015/0271444 | A1* | 9/2015 | Defazio | H04N 5/45 348/14.07 |
| 2016/0057391 | A1* | 2/2016 | Block | H04L 12/1822 348/14.07 |
| 2016/0072862 | A1* | 3/2016 | Bader-Natal | H04N 7/15 715/755 |
| 2016/0239196 | A1* | 8/2016 | Takahashi | G06F 3/0483 |
| 2017/0090710 | A1* | 3/2017 | Maekawa | G06F 3/0481 |
| 2017/0339336 | A1* | 11/2017 | Daliyot | H04N 23/62 |
| 2017/0353694 | A1* | 12/2017 | Yoakum | G06F 3/165 |
| 2018/0121214 | A1* | 5/2018 | Faulkner | G06F 3/04883 |
| 2019/0373214 | A1* | 12/2019 | Gurr | H04N 23/62 |
| 2020/0321029 | A1* | 10/2020 | Cui | H04N 5/77 |
| 2020/0371673 | A1* | 11/2020 | Faulkner | G06F 3/017 |
| 2021/0051245 | A1* | 2/2021 | Yu | H04N 23/57 |
| 2021/0405865 | A1* | 12/2021 | Faulkner | H04N 7/147 |
| 2022/0006972 | A1* | 1/2022 | Jia | H04N 7/147 |
| 2022/0070410 | A1* | 3/2022 | Nimmo | G03B 17/561 |
| 2022/0078374 | A1* | 3/2022 | Au | G06F 3/0486 |
| 2022/0086390 | A1* | 3/2022 | Erna | H04N 23/57 |
| 2022/0286314 | A1* | 9/2022 | Meyer | H04L 12/1827 |
| 2023/0028265 | A1* | 1/2023 | Powell | H04L 65/1083 |
| 2023/0308724 | A1* | 9/2023 | Yang | H04N 21/4788 |
| 2023/0341989 | A1* | 10/2023 | Bran | G06F 3/04845 |
| 2023/0412413 | A1* | 12/2023 | Kaptelinin | H04N 7/147 |

* cited by examiner

DYNAMIC CONFIGURATION OF INTERFACE ELEMENTS FOR EYE CONTACT IN A COMMUNICATION SESSION

CROSS-REFERENCE TO RELATED APPLICATIONS

The present application is a continuation of U.S. application Ser. No. 17/878,005, filed on Jul. 31, 2022, entitled "DYNAMIC CONFIGURATION OF INTERFACE ELEMENTS FOR EYE CONTACT IN A COMMUNICATION SESSION," the disclosure of which is incorporated by reference in its entirety for all purposes.

FIELD

The present application relates generally to digital communication, and more particularly, to systems and methods for providing dynamic configuration of interface elements for eye contact in a communication session.

SUMMARY

The appended claims may serve as a summary of this application.

BRIEF DESCRIPTION OF THE DRAWINGS

The present application relates generally to digital communication, and more particularly, to systems and methods for providing dynamic configuration of interface elements for eye contact in a communication session.

The present disclosure will become better understood from the detailed description and the drawings, wherein.

DETAILED DESCRIPTION OF THE DRAWINGS

Figure 1A:
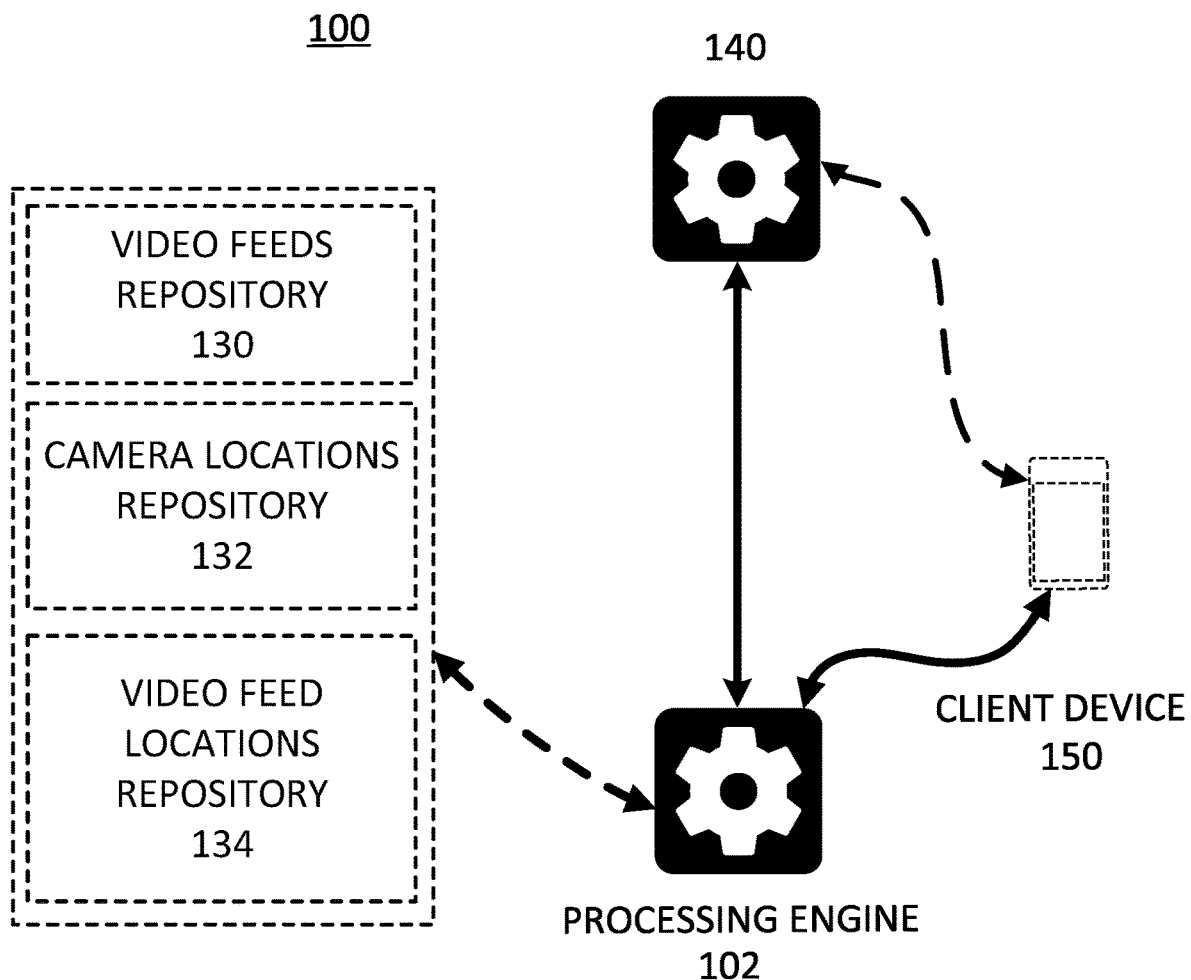
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

During a remote communication session within a communication platform, such as a remote video presentation, participants may typically see a user interface ("UI") with a number of UI components, such as participant windows, video streams, presentation slides, a shared desktop, or similar. A platform may typically be configured to present one view out of a number of available views. One such common view is an "active speaker view", where the video feed of the currently active speaker is presented as a highlighted video feed, and no other video feeds are presented.

Within the active speaker view, however, the system will typically place the highlighted active speaker video feed in the top left of the screen as a default placement for the feed. Most users, however, especially users of laptop devices, place their camera in a location that is at the top center of their monitor. When the camera of a participant is located at the top center of the monitor, but the active speaker the participant is most commonly listening to and speaking to is located in the top left of the monitor, there will be a lack of perceived eye contact between the participant and the speaker. The participant will appear to the active speaker as if they are looking to the left of where the active speaker's face is. Both participants will feel a sense of fatigue, and a lack of direct engagement in the session, as any conversation between the two speakers will not have direct eye contact.

Thus, there is a need in the field of digital communication tools and platforms to create new and useful systems and methods for providing dynamic configuration of interface elements for eye contact in a communication session. The source of the problem, as discovered by the inventors, is a lack of ability for a participant to identify where in relation to their monitor their camera(s) are placed. When active speakers, pinned speakers, or similarly highlighted speakers are placed by the system in a certain screen position, the system should default to placing such highlighted speakers in a screen position that is most aligned with the camera location(s) designated by the participant.

In one embodiment, a method presents, at one or more displays of a client device connected to a communication session, a user interface ("UP") for the communication session, the UI including one or more video feeds associated with participants of the communication session. The system receives a request from a participant to adjust one or more camera location settings, then presents the participant with one or more UI elements for designating camera location relative to the one or more displays of the client device. The system receives a designation from the participant of one or more camera locations relative to the one or more displays of the client device. The system determines one or more highlighted video feeds within the communication session, and then assigns a new location within the UI for each of the one or more highlighted video feeds corresponding to the designated camera locations relative to the one or more displays of the client device.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment in which some embodiments may operate. In the exemplary environment 100, a client device 150 is connected to a processing engine 102 and, optionally, a video communication platform 140. The processing engine 102 is connected to the video communication platform 140, and optionally connected to one or more repositories and/or databases, including, e.g., a video feeds repository 130, camera locations repository 132, and/or a video feed locations repository 134. One or more of the databases may be combined or split into multiple databases. The user's client device 150 in this environment may be a computer, and the video communication platform 140 and processing engine 102 may be applications or software hosted on a computer or multiple computers which are communicatively coupled via remote server or locally.

The exemplary environment 100 is illustrated with only one client device, one processing engine, and one video communication platform, though in practice there may be more or fewer additional client devices, processing engines, and/or video communication platforms. In some embodiments, the client device(s), processing engine, and/or video communication platform may be part of the same computer or device.

Figure 2:
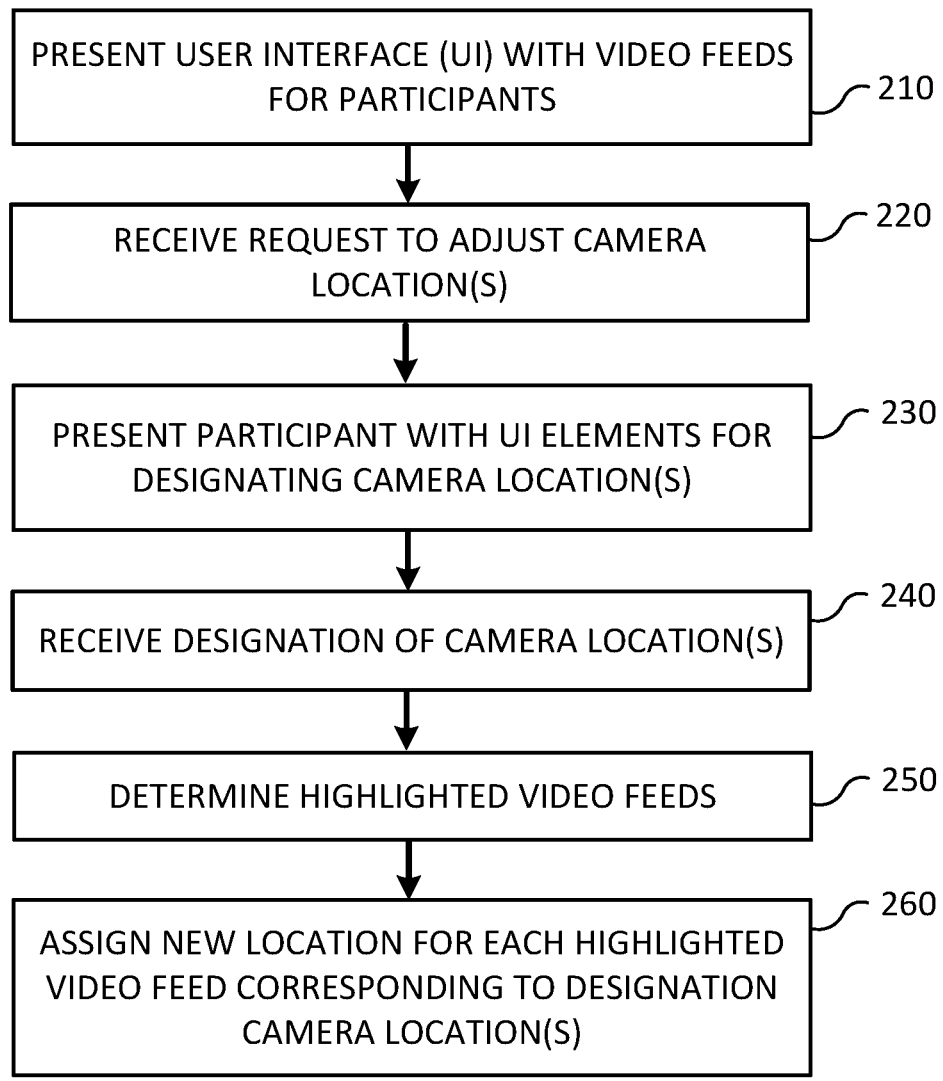
FIG. 2 is a flow chart illustrating an exemplary method that may be performed in some embodiments.

In an embodiment, the processing engine 102 may perform the exemplary method of FIG. 2 or other method herein and, as a result, provide dynamic configuration of interface elements for eye contact in a communication session. In some embodiments, this may be accomplished via communication with the client device, processing engine, video communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The client device 150 is a device with one or more displays configured to present information to a user of the device who is a participant of the video communication session. In some embodiments, the client device presents information in the form of a visual UI with multiple selectable UI elements or components. In some embodiments, the client device 150 is configured to send and receive signals and/or information to the processing engine 102 and/or video communication platform 140. In some embodiments, the client device is a computing device capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or video communication platform 140 may be hosted in whole or in part as an application or web service executed on the client device 150. In some embodiments, one or more of the video communication platform 140, processing engine 102, and client device 150 may be the same device. In some embodiments, the user's client device 150 is associated with a first user account within a video communication platform, and one or more additional client device(s) may be associated with additional user account(s) within the video communication platform.

In some embodiments, optional repositories can include one or more of a video feeds repository 130, camera locations repository 132, and/or video feed locations repository 134. The optional repositories function to store and/or maintain, respectively, video feeds within a video communication session; designated camera locations for a participant; and assigned locations of video feeds within the communication session. The optional database(s) may also store and/or maintain any other suitable information for the processing engine 102 or video communication platform 140 to perform elements of the methods and systems herein. In some embodiments, the optional database(s) can be queried by one or more components of system 100 (e.g., by the processing engine 102), and specific stored data in the database(s) can be retrieved.

Video communication platform 140 is a platform configured to facilitate meetings, presentations (e.g., video presentations) and/or any other communication between two or more parties, such as within, e.g., a video conference or virtual classroom. A video communication session within the video communication platform 140 may be, e.g., one-to-many (e.g., a participant engaging in video communication with multiple attendees), one-to-one (e.g., two friends remotely communication with one another by video), or many-to-many (e.g., multiple participants video conferencing with each other in a remote group setting).

Figure 1B:
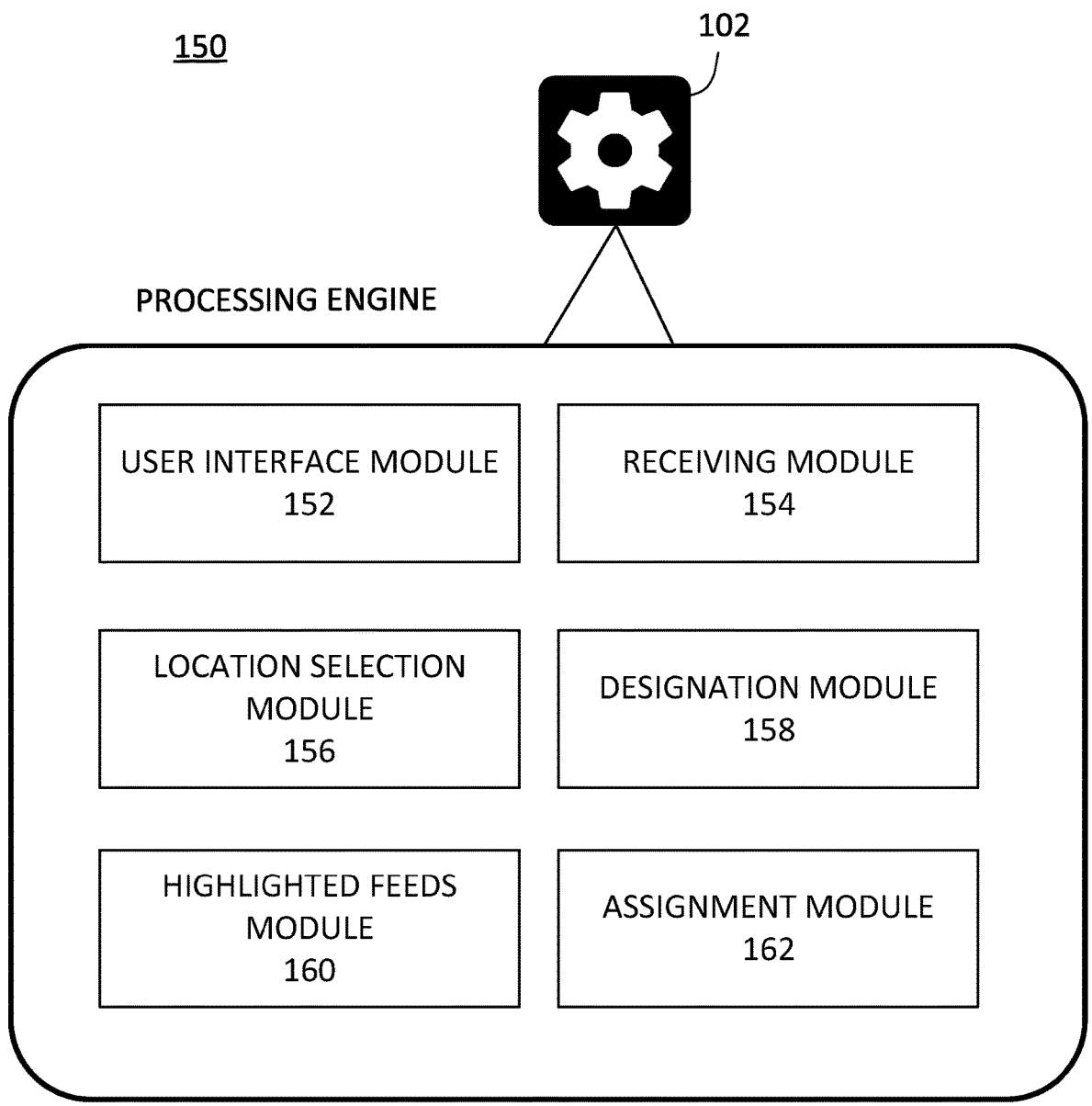
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

User interface module 152 functions to present a UI for each of a number of client devices connected to a communication session, with each UI including one or more video feeds associated with participants of the communication session.

Receiving module 154 functions to receive a request from a participant to adjust one or more camera location settings.

Location selection module 156 functions to present the participant with one or more UI elements for designating camera location relative to the one or more displays of the client device.

Designation module 158 functions to receive a designation from the participant of one or more camera locations relative to the one or more displays of the client device.

Highlighted feeds module 160 functions to determine one or more highlighted video feeds within the communication session.

Assignment module 162 functions to assign a new location within the UI for each of the one or more highlighted video feeds corresponding to the designated camera locations relative to the one or more displays of the client device.

The above modules and their functions will be described in further detail in relation to an exemplary method below.

FIG. 2 is a flow chart illustrating an exemplary method that may be performed in some embodiments.

At step 210, the system presents a UI for each of a number of client devices connected to a communication session, with each UI including one or more video feeds associated with participants of the communication session.

In some embodiments, the system connects participants to a live communication stream via their respective client devices. The communication stream may be any "session" (such as an instance of a video conference, webinar, informal chat session, or any other suitable session) initiated and hosted via the video communication platform, for remotely communicating with one or more users of the video communication platform, i.e., participants within the video communication session. Participants are connected on user devices, and are associated with user accounts within the communication platform.

The UI for the video communication session is displayed on the client device of each participant. In some embodiments, the UI appears different for different participants, or has different UI elements included for different participants depending on their user permissions, access levels (e.g., a premium-tier business user account as compared to a free-tier user account), or other aspects that may differentiate one participant from another within the video communication platform. In various embodiments, the UI is configured to allow the participant to, e.g., navigate within the video communication session, engage or interact with one or more functional elements within the video communication session, control one or more aspects of the video communication session, and/or configure one or more settings or preferences within the video communication session.

In some embodiments, the system receives a number of video feeds depicting imagery of a number of participants, the video feeds each having multiple video frames. In some embodiments, the video feeds are each generated via an external device, such as, e.g., a video camera or a smartphone with a built-in video camera, and then the video content is transmitted to the system. In some embodiments, the video content is generated within the system, such as on a participant's client device. For example, a participant may be using their smartphone to record video of themselves giving a lecture. The video can be generated on the smartphone and then transmitted to the processing system, a local or remote repository, or some other location. In some embodiments, one or more of the video feeds are pre-recorded and are retrieved from local or remote repositories. In various embodiments, the video content can be streaming or broadcasted content, pre-recorded video content, or any other suitable form of video content. The video feeds each have multiple video frames, each of which may be individually or collectively processed by the processing engine of the system.

In some embodiments, the video feeds are received from one or more video cameras connected to a client device associated with each participant. Thus, for example, rather than using a camera built into the client device, an external camera can be used which transmits video to the client device, or some combination of both.

In some embodiments, the participants are users of a video communication platform, and are connected remotely within a virtual communication room generated by the communication platform. This virtual communication room may be, e.g., a virtual classroom or lecture hall, a group room, a breakout room for subgroups of a larger group, or any other suitable communication room which can be presented within a communication platform. In some embodiments, synchronous or asynchronous messaging may be included within the communication session, such that the participants are able to textually "chat with" (i.e., sends messages back and forth between) one another in real time.

In some embodiments, the UI includes a number of selectable UI elements. For example, one UI may present selectable UI elements along the bottom of a communication session window, with the UI elements representing options the participant can enable or disable within the video session, settings to configure, and more. For example, UI elements may be present for, e.g., muting or unmuting audio, stopping or starting video of the participant, sharing the participant's screen with other participants, recording the video session, and/or ending the video session.

At least a portion of the UI displays a number of participant windows. The participant windows correspond to the multiple participants in the video communication session. Each participant is connected to the video communication session via a client device. In some embodiments, the participant window may include video, such as, e.g., video of the participant or some representation of the participant, a room the participant is in or virtual background, and/or some other visuals the participant may wish to share (e.g., a document, image, animation, or other visuals). In some embodiments, the participant's name (e.g., real name or chosen username) may appear in the participant window as well. One or more participant windows may be hidden within the UI, and selectable to be displayed at the user's discretion. Various configurations of the participant windows may be selectable by the user (e.g., a square grid of participant windows, a line of participant windows, or a single participant window). In some embodiments, the participant windows are arranged in a specific way according to one or more criteria, such as, e.g., current or most recent verbal participation, host status, level of engagement, and any other suitable criteria for arranging participant windows. Some participant windows may not contain any video, for example, if a participant has disabled video or does not have a connected video camera device (e.g. a built-in camera within a computer or smartphone, or an external camera device connected to a computer).

At step 220, the system receives a request from a participant to adjust one or more camera location settings. The camera location settings correspond to locations of physical camera devices relative to the user's screen and UI.

In some embodiments, the system receives the request from the client device. The request may take the form of a participant using the client device interactively selecting one or more UI components in such a way that a request is triggered for the system. In some embodiments, a user may, for example, select a button or UI component labeled as a way to adjust camera location settings, or may click an icon visually indicating that a settings page may be navigated to, with the settings page including a way to navigate to camera location settings in particular.

In some embodiments, the UI presents a window or section for adjusting camera settings, video settings, background settings, filter settings, and/or other settings. In some embodiments, the user may request to navigate to a subsection of this settings section for adjusting camera location settings in particular.

At step 230, the system presents the participant with one or more UI elements for designating camera location relative to the one or more displays of the client device.

In some embodiments, one or more UI elements may include a video feed of the participant themselves, which is displayed within the UI. In some embodiments, the UI elements include one or more interactive camera icons which the user can place around a virtual screen. For example, around the video feed, one or more camera icons or other icons or visual indicators may be displayed, representing camera devices currently connected to the system. In some embodiments, such connected camera devices are automatically detected by the system. In some embodiments, the cameras may be labeled with device names, which are populated as a result of auto-detection of the connected camera devices. In some embodiments, only one camera device icon is displayed, as the only connected camera device may be a built-in camera of the client device itself, e.g., a built-in camera of a smartphone, tablet, or laptop. One example of the system presenting a participant with one or more UI elements for designating camera location is illustrated in FIG. 3A, described below.

Figure 3A:
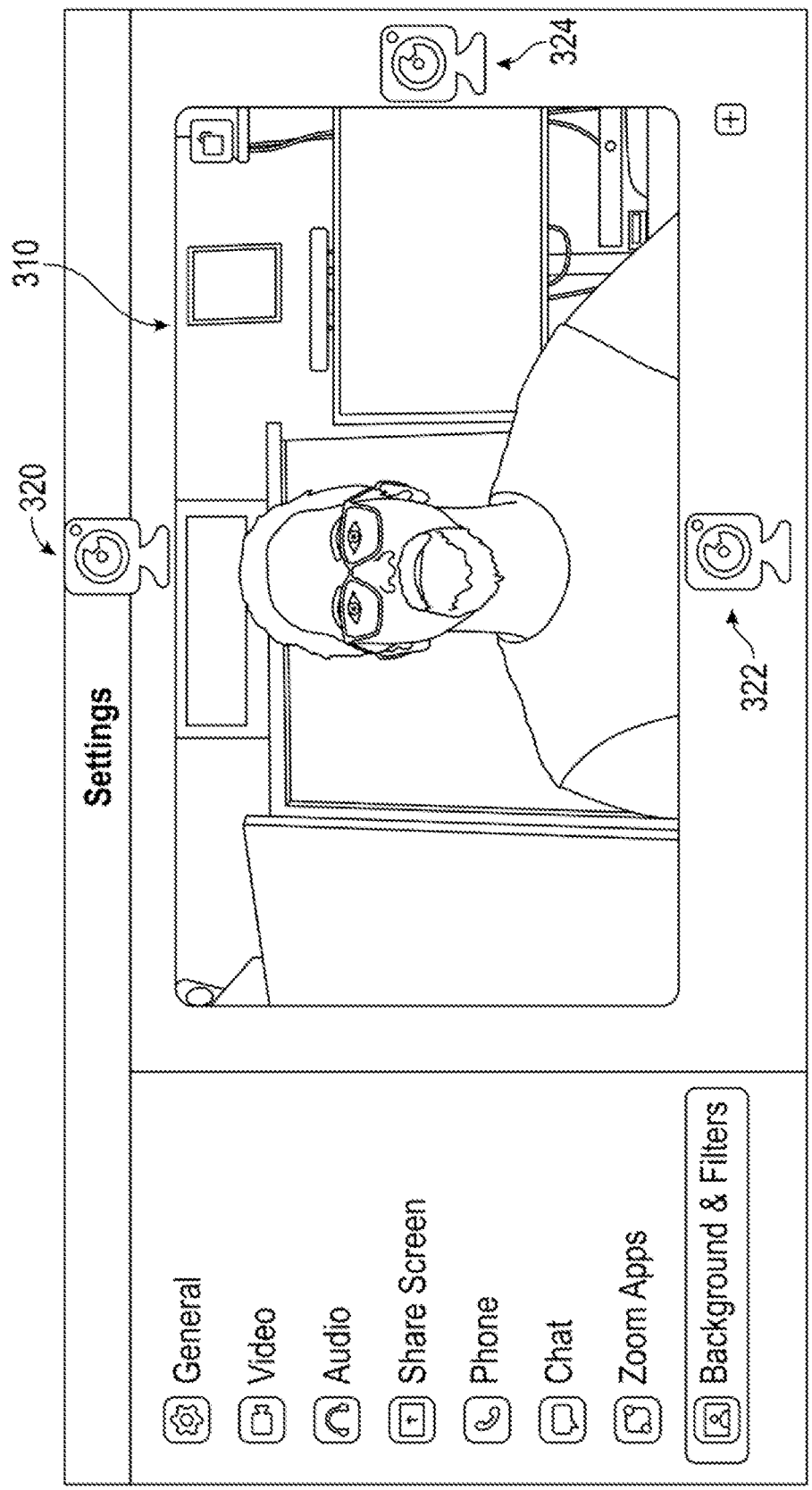
FIG. 3A is a diagram illustrating one example embodiment of presenting user interface elements for designating camera location, according to some embodiments.

FIG. 3A is a diagram illustrating one example embodiment of presenting user interface elements for designating camera location, according to some embodiments. Within the diagram, a settings UI window is displayed, with a subsection or tabbed section for Background & Filters being further displayed. Inside the window, UI elements for designating camera location for a user are presented. One UI element being presented is a video feed 310 of the user in question. Arranged around the video feed 310 of the user are three camera icons 320, 322, and 324, representing current or default placement of cameras around the user's physical environment. For example, camera icon 320 being placed above the user's head, toward the top of the screen may indicate that the user's camera is positioned above the user's computer monitor or screen, as is common for many webcam setups. Camera icon 322 may indicate that a second camera is located below the user's monitor or screen, and camera icon 324 may indicate that a third camera is located to the right of the user's monitor or screen.

Returning to FIG. 2, at step 240, the system receives a designation from the participant of one or more camera locations relative to the one or more displays of the client device. In some embodiments, the designation of these camera location(s) is submitted by the user via the UI presented which allows the user to select camera locations, as described above with respect to step 230.

In some embodiments, upon the system presenting the participant with a video feed with one or more UI elements designating camera locations, the system may allow the user to designating one or more camera locations relative to the one or more displays of the client device. In some embodiments, this may involve allowing the user to click and hold one or more of the UI elements to drag them to new location(s) within the displayed video feed, or otherwise interactively selecting the UI elements to place them in new location(s) within the displayed video feed. In some embodiments, a user may add one or more camera locations if the currently displayed selection does not include the correct number of cameras and their locations. In some embodiments, the user may remove one or more camera locations if there are too many cameras and their locations displayed with respect to the video feed.

In some embodiments, the client device configuration may include multiple monitors. In some embodiments, the layout of the camera locations is respective of the number of monitors present within the configuration. In some embodiments, this number of monitors is detected by the operating system within the client device. In some embodiments, the UI presented for designating camera location includes the multi-monitor setup represented visually for where the camera locations are to be designated. In some embodiments, instead of representing multiple monitors, the UI presents a virtual display, such as, e.g., a long display visually represented where the user may place cameras in the correct locations relative to their multi-monitor setup. Thus, the UI may present the overall concept of the multi-monitor setup rather than the specific configuration and number of monitors present.

In some embodiments, if the user notices that any of these camera locations is incorrect or inaccurate, the user may click and hold the camera icon to drag it to a new location within the displayed video feed.

In some embodiments, the designation from the participant of one or more camera locations includes a selection of one or more cameras to be used during the communication session. For example, in some embodiments, there may be multiple cameras in the user's physical vicinity or connected to the client device which may be used or not used within the communication session. A user may wish to, for example, user a computer web cam as a camera in the session, but not a smartphone camera which is located nearby. In some embodiments, the user may be presented with a UI which allows the user to select one or more cameras from a list of detected cameras to be used within the session.

In some embodiments, the system determines a recommended placement for one or more of the camera locations. The system may determine a placement for camera location(s) via one or more rules for optimal camera placement, one or more machine learning or other artificial intelligence techniques, or other suitable techniques or methods for determining a recommended placement. In some embodiments, the designation of the one or more camera locations corresponds to the recommended placement that has been determined. Thus, in various embodiments, the user may have an option to select one or more recommended placements that have been determined for the user's setup, or those recommended placements may automatically be designated as camera locations without the user's input or confirmation.

In some embodiments, the system stores the designations of the one or more camera locations relative to the one or more displays of the client device for retrieval by the participant in a future communication session. For example, if the user has a weekly meeting with the same camera setup and same video feeds present each week, then the system can automatically recall the designated camera locations for that setup and apply them to the video feeds without the user needing to manually configure the designated locations each week. In some embodiments, the stored designations include a preset camera configuration. A user may be able to save a present configuration such that it can be selected for future sessions, thus loading up a preset setup without needing to manually configure a setup in the future sessions.

Returning to FIG. 3A, within the displayed section showing UI elements representing camera locations, the user may be allowed to interact with the displayed section and/or UI elements to designate camera locations. In some embodiments, the system may allow the user to drag the camera icons to new locations anywhere within the displayed borders of the screen. In some embodiments, the user may be able to drag the camera icons anywhere on the screen. In some embodiments, a "+" symbol in the lower right may be selected by the user to add an additional camera icon representing a camera location for a specific camera device.

Returning to FIG. 2, at step 250, the system determines one or more highlighted video feeds within the communication session. In some embodiments, the one or more highlighted video feeds include one or more video feeds designated as "pinned" video feeds. In some embodiments, the feeds may include one or more video feeds designated as "active speaker" video feeds. A "pinned" or "highlighted" video feed may be any feed which the communication platform recognizes as a feed which some importance or relevance, such as, for example, a feed where some activity is happening, or a feed the user has indicated is to be displayed within their UI regardless of other feeds which may or may not have some activity taking place in them. For example, if an active speaker is talking within one video feed, then the communication platform may be configured to automatically "pin" or highlight that feed such that it always appears when the speaker is speaking. Such a feed where an active speaker is talking may also be deemed an "active speaker" video feed to be pinned or highlighted. In some embodiments, if the speaker stops speaking, then the feed may be unpinned, while in other embodiments, the feed may continue to be pinned, and thus present and visible within the user's UI, even if the speaker has stopped speaking. In another example, a user may indicate that their supervisor's feed should always be pinned and thus visible at all times during a session, even if the supervisor is not speaking and no activity is taking place on the supervisor's feed. This may be useful for a user in some circumstances, such as when a user is interested in seeing their supervisor's facial reactions to various statements spoken during the session. In some embodiments, the system determines which video feeds are highlighted feeds by querying the communication platform for a list of pinned or highlighted video feeds in the communication session for the user. In some embodiments, the system may periodically monitor the session to determine which feeds are highlighted or pinned, while in other embodiments, the system may make this determination upon either receiving the designations of camera location settings, or receiving some indication of a change in the list of highlighted or pinned video feeds.

At step 260, the system assigns a new location within the UI for each of the one or more highlighted video feeds corresponding to the designated camera locations relative to the one or more displays of the client device. In some embodiments, the new location within the UI for each of the one or more highlighted video feeds is the closest available location to one of the designated camera locations, which were received during step 240.

Figure 3B:
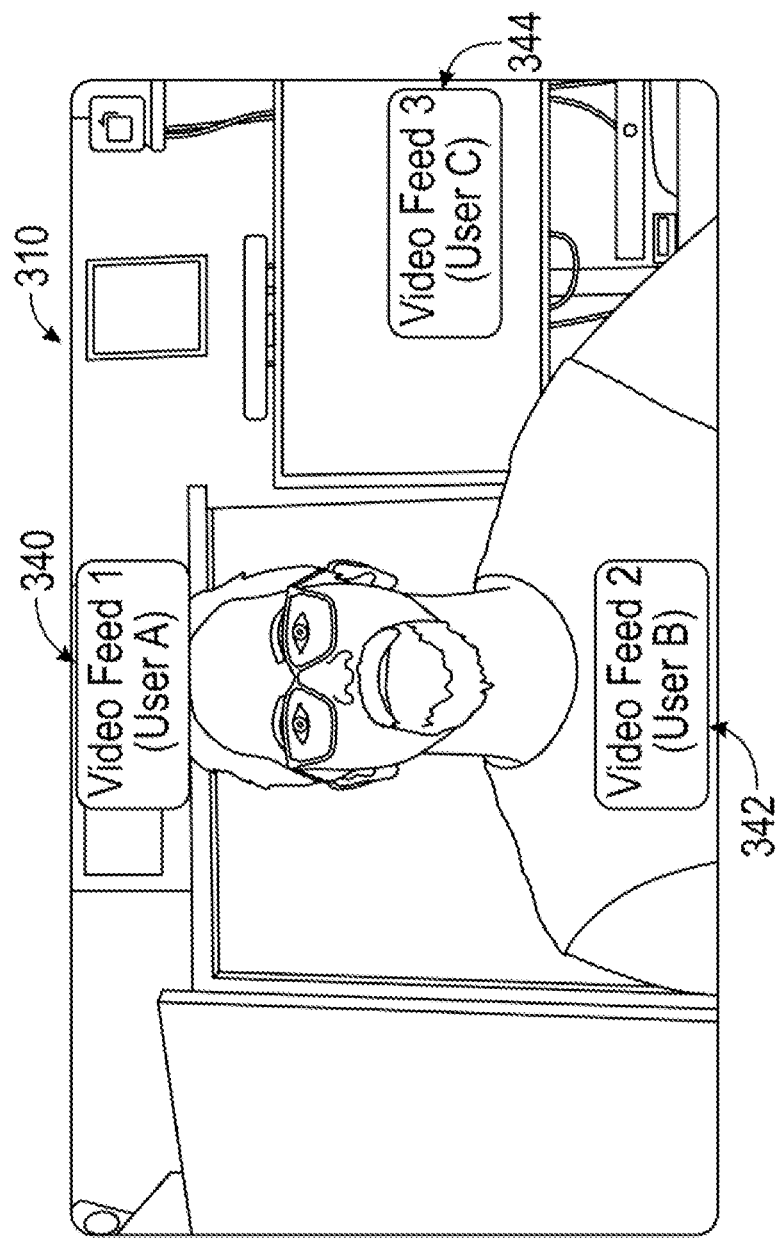
FIG. 3B is a diagram illustrating one example embodiment of assigning new locations for highlighted video feeds corresponding to designated camera locations, according to some embodiments.

FIG. 3B is a diagram illustrating one example embodiment of assigning new locations for highlighted video feeds corresponding to designated camera locations, according to some embodiments. In the illustrated example, the user from FIG. 3A has designated camera locations and is viewing a number of video feeds presented within the user's UI. The user is connected to a communication session, and the video feeds are presented as part of that communication session. Video feed 1 for User A 340 is shown at the top center of the UI; video feed 2 for User B 342 is shown at the bottom center of the UI; and video feed 3 for User C 344 is shown at the middle right of the UI. Each one of these video feeds corresponds to a designated camera location which the user selected previously, as described in FIG. 3A (i.e., designated camera locations which correspond to camera icons 320, 322, and 324).

In some embodiments, the system assigns a new location within the UI for a self-view video feed depicting the participant corresponding to the designated camera locations relative to the one or more displays of the client device. For example, in FIG. 3B, the UI for the communication session is presented such that the user's self-view video feed 310 is in the center of the UI, with the video feeds arranged according to the designated camera locations.

Returning to FIG. 2, in some embodiments, the system detects a location of one or more camera devices connected to the client device, then automatically assigns a new location for one or more of the highlighted video feeds based on this detection. That is, in some embodiments, rather than the user designating a camera location for each camera device the user is employing, the system automatically assigns these locations based on detecting the locations of these camera devices. In some embodiments, this detection is performed via one or more sensors which are able to provide locational data for the camera devices. These sensors may be located, for example, inside or near the camera devices and/or client device which is connected to the communication session.

In some embodiments, the system receives an additional video feed associated with a participant of the communication session; determines that the additional video feed has been designated as a highlighted video feed; and assigns a new location within the UI for the additional video feed corresponding to one of the designated camera locations relative to the one or more displays of the client device. Thus, for example, if a new user joins the communication session, and that user's video feed is highlighted or pinned, then the system can assign a location for that video feed within the UI so that the new highlighted feed can be presented within the UI. In some embodiments, the assigned new location for the additional video feed is the location of a different video feed, and the additional video feed replaces the different video feed in the location.

In some embodiments, the system receives a user adjustment of the new location of one or the highlighted video feeds, then assigns the highlighted video feed to an adjusted location based on the user adjustment. For example, in some embodiments, the user may be allowed to click and drag a highlighted video feed to a new location within the UI, and the system can respond by assigning that highlighted video feed to the new location in real time. In this way, a user can make adjustments to the designated camera locations to suit the user's needs. A user may be able to, for example, change the physical location of one or more cameras, then change the locations of video feeds corresponding to those cameras without needing to enter a separate settings UI to do so.

In some embodiments, the system receives a user request to pin one of the video feeds in the communication session to its new location permanently, then assigns the new location to the video feed permanently, such that no new video feeds are assigned to the new location until the video feed is unpinned. For example, a user may be allowed to right click on a video feed and select, e.g., "pin this video feed" or "pin this feed permanently". Once the user does this, then no other video feeds may be assigned to that camera location for the rest of the communication session, unless the user chooses to right click once more and select, e.g., "unpin this video feed" or similar. In some embodiments, the system assigns one or more highlighted video feeds to locations other than the new location of the pinned video feed based on the designated camera locations.

Figure 4:
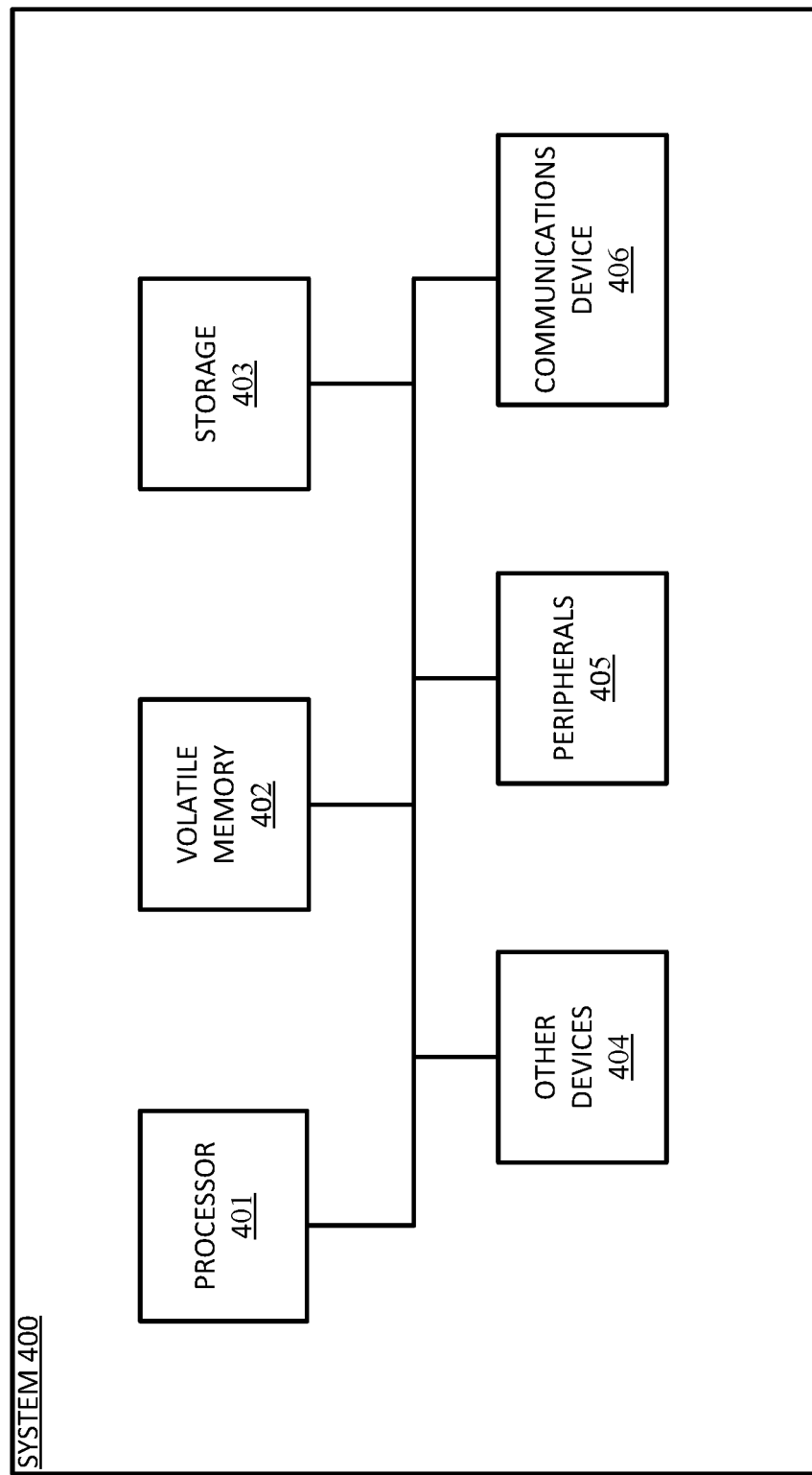
FIG. 4 is a diagram illustrating an exemplary computer that may perform processing in some embodiments.

FIG. 4 is a diagram illustrating an exemplary computer that may perform processing in some embodiments. Exemplary computer 400 may perform operations consistent with some embodiments. The architecture of computer 400 is exemplary. Computers can be implemented in a variety of other ways. A wide variety of computers can be used in accordance with the embodiments herein.

Processor 401 may perform computing functions such as running computer programs. The volatile memory 402 may provide temporary storage of data for the processor 401. RAM is one kind of volatile memory. Volatile memory typically requires power to maintain its stored information. Storage 403 provides computer storage for data, instructions, and/or arbitrary information. Non-volatile memory, which can preserve data even when not powered and including disks and flash memory, is an example of storage. Storage 403 may be organized as a file system, database, or in other ways. Data, instructions, and information may be loaded from storage 403 into volatile memory 402 for processing by the processor 401.

The computer 400 may include peripherals 405. Peripherals 405 may include input peripherals such as a keyboard, mouse, trackball, video camera, microphone, and other input devices. Peripherals 405 may also include output devices such as one or more displays. Peripherals 405 may include removable media devices such as CD-R and DVD-R recorders/players. Communications device 406 may connect the computer 100 to an external medium. For example, communications device 406 may take the form of a network adapter that provides communications to a network. A computer 400 may also include a variety of other devices 404. The various components of the computer 400 may be connected by a connection medium such as a bus, crossbar, or network.

It will be appreciated that the present disclosure may include any one and up to all of the following examples.

Example 1. A method comprising: presenting, at one or more displays of a client device connected to a communication session, a user interface (UI) for the communication session, the UI comprising one or more video feeds associated with participants of the communication session; receiving a request from a participant to adjust one or more camera location settings; presenting the participant with one or more UI elements for designating camera location relative to the one or more displays of the client device; receiving a designation from the participant of one or more camera locations relative to the one or more displays of the client device; determining one or more highlighted video feeds within the communication session; and assigning a new location within the UI for each of the one or more highlighted video feeds corresponding to the designated camera locations relative to the one or more displays of the client device.

Example 2. The method of example 1, wherein the one or more UI elements for designating camera location relative to the one or more displays of the client device comprise one or more interactive camera icons which the user can place around a virtual screen.

Example 3. The method of any of examples 1-2, wherein the one or more highlighted video feeds comprise one or more video feeds designated as pinned video feeds.

Example 4. The method of any of examples 1-3, further comprising: assigning a new location within the UI for a self-view video feed depicting the participant corresponding to the designated camera locations relative to the one or more displays of the client device.

Example 5. The method of any of examples 1-4, wherein the new location within the UI for each of the one or more highlighted video feeds is the closest available location to one of the designated camera locations.

Example 6. The method of any of examples 1-5, wherein the designation from the participant of one or more camera locations comprises a selection of one or more cameras to be used during the communication session.

Example 7. The method of any of examples 1-6, wherein the one or more highlighted video feeds comprise one or more video feeds designated as active speaker video feeds.

Example 8. The method of any of examples 1-7, further comprising: storing the designations of the one or more camera locations relative to the one or more displays of the client device for retrieval by the participant in a future communication session, the stored designations comprising a preset camera configuration.

Example 9. The method of any of examples 1-8, further comprising: determining a recommended placement for one or more of the camera locations, wherein the designation of the one or more camera locations corresponds to the recommended placement.

Example 10. The method of any of examples 1-9, further comprising: detecting a location of one or more camera devices connected to the client device; and automatically assigning a new location for one or more of the highlighted video feeds based on the detection.

Example 11. The method of any of examples 1-10, further comprising: receiving an additional video feed associated with a participant of the communication session; determining that the additional video feed has been designated as a highlighted video feed; and assigning a new location within the UI for the additional video feed corresponding to one of the designated camera locations relative to the display of the client device.

Example 12. The method of example 11, wherein the assigned new location for the additional video feed is the location of a different video feed, and wherein the additional video feed replaces the different video feed in the location.

Example 13. The method of any of examples 1-12, further comprising: receiving a user adjustment of the new location of one or the highlighted video feeds; and assigning the highlighted video feed to an adjusted location based on the user adjustment.

Example 14. The method of any of examples 1-13, further comprising: receiving a user request to pin one of the video feeds in the communication session to its new location permanently; and assigning the new location to the video feed permanently, such that no new video feeds are assigned to the new location until the video feed is unpinned.

Example 15. The method of example 14, further comprising: assigning one or more highlighted video feeds to locations other than the new location of the pinned video feed based on the designated camera locations.

Example 16. A communication system comprising one or more processors configured to perform the operations of: presenting, at one or more displays of a client device connected to a communication session, a user interface (UI) for the communication session, the UI comprising one or more video feeds associated with participants of the communication session; receiving a request from a participant to adjust one or more camera location settings; presenting the participant with one or more UI elements for designating camera location relative to the one or more displays of the client device; receiving a designation from the participant of one or more camera locations relative to the one or more displays of the client device; determining one or more highlighted video feeds within the communication session; and assigning a new location within the UI for each of the one or more highlighted video feeds corresponding to the designated camera locations relative to the one or more displays of the client device.

Example 17. The communication system of example 16, wherein the one or more UI elements for designating camera location relative to the one or more displays of the client device comprise one or more interactive camera icons which the user can place around a virtual screen.

Example 18. The communication system of any of examples 16-17, wherein the one or more highlighted video feeds comprise one or more video feeds designated as pinned video feeds.

Example 19. The communication system of any of examples 16-18, wherein the one or more processors are further configured to perform the operations of: assigning a new location within the UI for a self-view video feed depicting the participant corresponding to the designated camera locations relative to the one or more displays of the client device.

Example 20. The communication system of any of examples 16-19, wherein the new location within the UI for each of the one or more highlighted video feeds is the closest available location to one of the designated camera locations.

Example 21. The communication system of any of examples 16-20, wherein the designation from the participant of one or more camera locations comprises a selection of one or more cameras to be used during the communication session.

Example 22. The communication system of any of examples 16-21, wherein the one or more highlighted video feeds comprise one or more video feeds designated as active speaker video feeds.

Example 23. The communication system of any of examples 16-22, wherein the one or more processors are further configured to perform the operations of: storing the designations of the one or more camera locations relative to the one or more displays of the client device for retrieval by the participant in a future communication session, the stored designations comprising a preset camera configuration.

Example 24. The communication system of any of examples 16-23, wherein the one or more processors are further configured to perform the operations of: determining a recommended placement for one or more of the camera locations, wherein the designation of the one or more camera locations corresponds to the recommended placement.

Example 25. The communication system of any of examples 16-24, wherein the one or more processors are further configured to perform the operations of: detecting a location of one or more camera devices connected to the client device; and automatically assigning a new location for one or more of the highlighted video feeds based on the detection.

Example 26. The communication system of example 25, wherein the assigned new location for the additional video feed is the location of a different video feed, and wherein the additional video feed replaces the different video feed in the location.

Example 27. The communication system of any of examples 16-26, wherein the one or more processors are further configured to perform the operations of: receiving a user adjustment of the new location of one or the highlighted video feeds; and assigning the highlighted video feed to an adjusted location based on the user adjustment.

Example 28. The communication system of any of examples 16-27, wherein the one or more processors are further configured to perform the operations of: receiving a user request to pin one of the video feeds in the communication session to its new location permanently; and assigning the new location to the video feed permanently, such that no new video feeds are assigned to the new location until the video feed is unpinned.

Example 29. The communication system of example 28, wherein the one or more processors are further configured to perform the operations of: assigning one or more highlighted video feeds to locations other than the new location of the pinned video feed based on the designated camera locations.

Example 30. The communication system of any of examples 16-29, wherein the one or more processors are further configured to perform the operation of: assigning a new location within the UI for a self-view video feed depicting the participant corresponding to the designated camera locations relative to the one or more displays of the client device.

Example 31. A non-transitory computer-readable medium comprising: instructions for presenting, at one or more displays of a client device connected to a communication session, a user interface (UI) for the communication session, the UI comprising one or more video feeds associated with participants of the communication session; instructions for receiving a request from a participant to adjust one or more camera location settings; instructions for presenting the participant with one or more UI elements for designating camera location relative to the one or more displays of the client device; instructions for receiving a designation from the participant of one or more camera locations relative to the one or more displays of the client device; instructions for determining one or more highlighted video feeds within the communication session; and instructions for assigning a new location within the UI for each of the one or more highlighted video feeds corresponding to the designated camera locations relative to the one or more displays of the client device.

Example 32. The non-transitory computer-readable medium of example 31, wherein the one or more UI elements for designating camera location relative to the one or more displays of the client device comprise one or more interactive camera icons which the user can place around a virtual screen.

Example 33. The non-transitory computer-readable medium of any of examples 31-32, wherein the one or more highlighted video feeds comprise one or more video feeds designated as pinned video feeds.

Example 34. The non-transitory computer-readable medium of any of examples 31-33, further comprising: assigning a new location within the UI for a self-view video feed depicting the participant corresponding to the designated camera locations relative to the one or more displays of the client device.

Example 35. The non-transitory computer-readable medium of any of examples 31-34, wherein the new location within the UI for each of the one or more highlighted video feeds is the closest available location to one of the designated camera locations.

Example 36. The non-transitory computer-readable medium of any of examples 31-35, wherein the designation from the participant of one or more camera locations comprises a selection of one or more cameras to be used during the communication session.

Example 37. The non-transitory computer-readable medium of any of examples 31-36, wherein the one or more highlighted video feeds comprise one or more video feeds designated as active speaker video feeds.

Example 38. The non-transitory computer-readable medium of any of examples 31-37, further comprising: storing the designations of the one or more camera locations relative to the one or more displays of the client device for retrieval by the participant in a future communication session, the stored designations comprising a preset camera configuration.

Example 39. The non-transitory computer-readable medium of any of examples 31-38, further comprising: determining a recommended placement for one or more of the camera locations, wherein the designation of the one or more camera locations corresponds to the recommended placement.

Example 40. The non-transitory computer-readable medium of any of examples 31-39, further comprising: detecting a location of one or more camera devices connected to the client device; and automatically assigning a new location for one or more of the highlighted video feeds based on the detection.

Example 41. The non-transitory computer-readable medium of any of examples 31-40, further comprising: receiving an additional video feed associated with a participant of the communication session; determining that the additional video feed has been designated as a highlighted video feed; and assigning a new location within the UI for the additional video feed corresponding to one of the designated camera locations relative to the display of the client device.

Example 42. The non-transitory computer-readable medium of example 41, wherein the assigned new location for the additional video feed is the location of a different video feed, and wherein the additional video feed replaces the different video feed in the location.

Example 43. The non-transitory computer-readable medium of any of examples 31-42, further comprising: receiving a user adjustment of the new location of one or the highlighted video feeds; and assigning the highlighted video feed to an adjusted location based on the user adjustment.

Example 44. The non-transitory computer-readable medium of any of examples 31-43, further comprising: receiving a user request to pin one of the video feeds in the communication session to its new location permanently; and assigning the new location to the video feed permanently, such that no new video feeds are assigned to the new location until the video feed is unpinned.

Example 45. The non-transitory computer-readable medium of example 44, further comprising: assigning one or more highlighted video feeds to locations other than the new location of the pinned video feed based on the designated camera locations. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
  presenting, at a plurality of displays of a client device associated with a participant connected to a communication session hosted by a communications platform, a user interface (UI) for the communication session, the UI comprising a plurality of video feeds associated with participants of the communication session and a self-view video feed depicting the participant;
  receiving a request from the participant to adjust one or more camera location settings;
  presenting the participant with a virtual representation of the plurality of displays including one or more UI elements for designating camera locations relative to the plurality of displays of the client device;
  receiving a designation from the participant of one or more camera locations relative to the plurality of displays of the client device;
  determining one or more highlighted video feeds from among the plurality of video feeds within the communication session comprising outputting, to the communications platform, a query including a request for an identification of the one or more highlighted video feeds; and assigning a new location within the UI for each of the one or more highlighted video feeds corresponding to the one or more camera locations designated relative to the plurality of displays of the client device.

2. The method of claim 1, wherein the one or more UI elements for designating camera locations relative to the plurality of displays of the client device comprise one or more interactive camera icons which the participant can place around the virtual representation of the plurality of displays.

3. The method of claim 1, wherein the one or more highlighted video feeds comprise one or more first video feeds designated as pinned video feeds.

4. The method of claim 1, further comprising:
assigning a first new location within the UI for the self-view video feed depicting the participant corresponding to the one or more camera locations designated relative to the plurality of displays of the client device.

5. The method of claim 1, wherein the new location within the UI for each of the one or more highlighted video feeds is a closest available location to one of the one or more camera locations designated relative to the plurality of displays of the client device.

6. The method of claim 1, wherein the designation from the participant of the one or more camera locations comprises a selection of one or more cameras to be used during the communication session.

7. The method of claim 1, wherein the one or more highlighted video feeds comprise one or more first video feeds designated as active speaker video feeds.

8. The method of claim 1, further comprising:
storing the designation of the one or more camera locations relative to the plurality of displays of the client device for retrieval by the participant in a future communication session, the stored designation comprising a preset camera configuration.

9. The method of claim 1, further comprising:
determining a recommended placement for the one or more camera locations,
wherein the designation of the one or more camera locations corresponds to the recommended placement.

10. The method of claim 1, further comprising:
detecting a location of one or more camera devices connected to the client device; and
automatically assigning a first new location for one or more first highlighted video feeds of the one or more highlighted video feeds based on the detection.

11. The method of claim 1, further comprising:
receiving an additional video feed associated with a second participant of the communication session;
determining that the additional video feed has been designated as a highlighted video feed; and
assigning a first new location within the UI for the additional video feed corresponding to one of the designated camera locations relative to a display from among the one or more displays of the client device.

12. The method of claim 11, wherein the first new location for the additional video feed is a location of a different video feed, and wherein the additional video feed replaces the different video feed in the location of the different video feed.

13. The method of claim 1, further comprising:
receiving a user adjustment of the new location of a first highlighted video feed of the one or more highlighted video feeds; and
assigning the first highlighted video feed to an adjusted location based on the user adjustment.

14. The method of claim 1, further comprising:
receiving a user request to pin a first video feed in the communication session to a first new location permanently; and
assigning the first new location to the first video feed permanently, such that no new video feeds are assigned to the first new location until the first video feed is unpinned.

15. The method of claim 14, further comprising:
assigning one or more first highlighted video feeds to locations other than the first new location of the first video feed based on the designated camera locations.

16. A communication system comprising one or more processors configured to perform operations including:
presenting, at a plurality of displays of a client device associated with a participant connected to a communication session hosted by a communications platform, a user interface (UI) for the communication session, the UI comprising a plurality of video feeds associated with participants of the communication session and a self-view video feed depicting the participant;
receiving a request from the participant to adjust one or more camera location settings;
presenting the participant with a virtual representation of the plurality of displays including one or more UI elements for designating camera location relative to the plurality of displays of the client device;
receiving a designation from the participant of one or more camera locations relative to the plurality of displays of the client device;
determining one or more highlighted video feeds from among the plurality of video feeds within the communication session comprising outputting, to the communications platform, a query including a request for an identification of the one or more highlighted video feeds; and
assigning a new location within the UI for each of the one or more highlighted video feeds corresponding to the one or more camera locations designated relative to the plurality of displays of the client device.

17. The communication system of claim 16, wherein the one or more UI elements for designating camera locations relative to the plurality of displays of the client device comprise one or more interactive camera icons which the participant can place around the virtual representation of the plurality of displays.

18. The communication system of claim 16, wherein the one or more highlighted video feeds comprise one or more first video feeds designated as pinned video feeds.

19. The communication system of claim 16, wherein the one or more processors are further configured to perform an operation of:
assigning a first new location within the UI for the self-view video feed depicting the participant corresponding to the one or more camera locations designated relative to the plurality of displays of the client device.

20. A non-transitory computer-readable medium comprising:
instructions for presenting, at a plurality of displays of a client device associated with a participant connected to a communication session hosted by a communications platform, a user interface (UI) for the communication session, the UI comprising a plurality of video feeds associated with participants of the communication session and a self-view video feed depicting the participant;
instructions for receiving a request from the participant to adjust one or more camera location settings;
instructions for presenting the participant with a virtual representation of the plurality of displays including one or more UI elements for designating a camera location relative to the plurality of displays of the client device;
instructions for receiving a designation from the participant of one or more camera locations relative to the plurality of displays of the client device;
instructions for determining one or more highlighted video feeds from among the plurality of video feeds within the communication session comprising outputting, to the communications platform, a query including a request for an identification of the one or more highlighted video feeds; and
instructions for assigning a new location within the UI for each of the one or more highlighted video feeds corresponding to the one or more camera locations designated relative to the plurality of displays of the client device.

* * * * *